UNITED STATES PATENT OFFICE 2,583,611

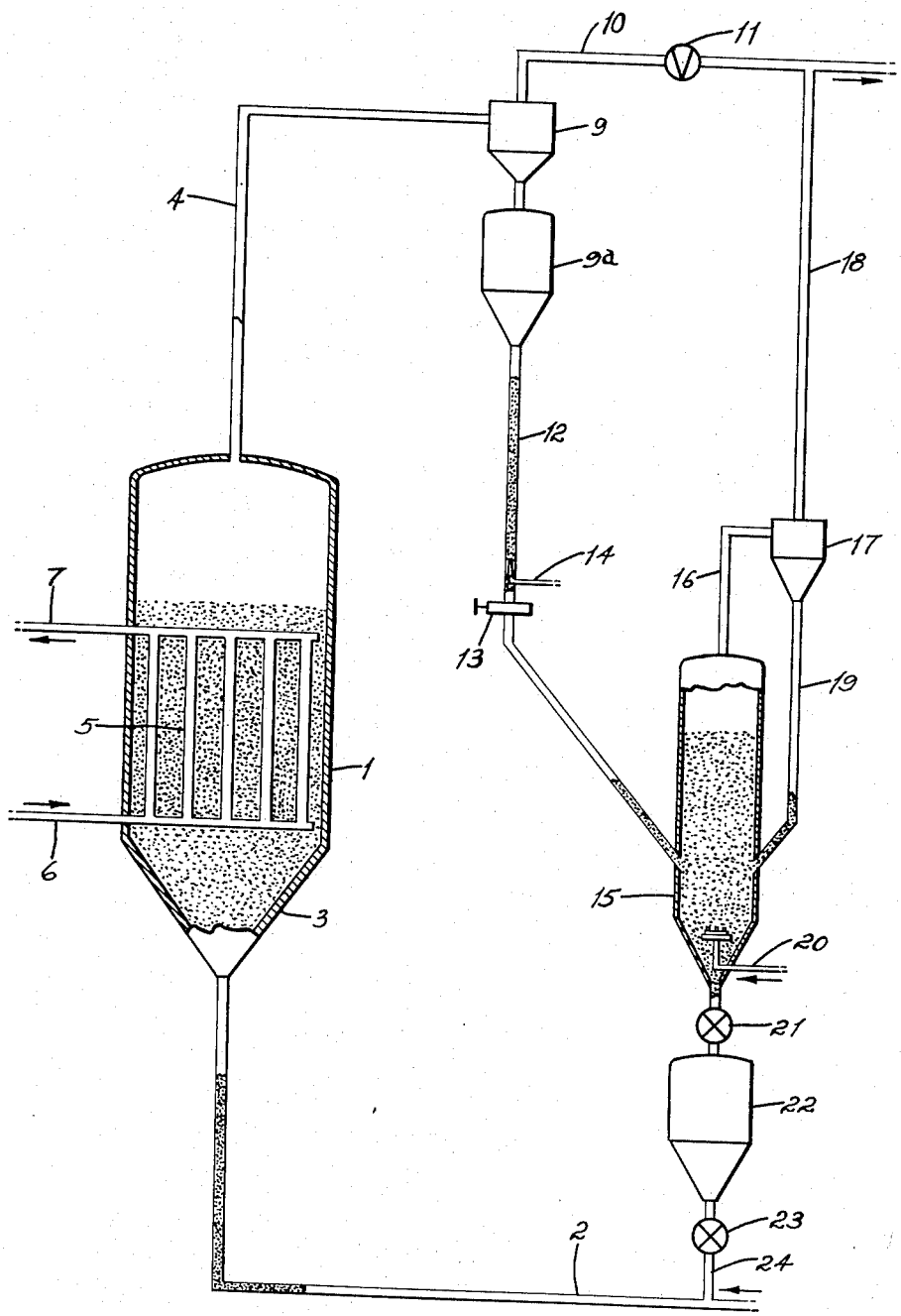

METHOD FOR THE SYNTHESIS OF HYDROCARBONS IN THE PRESENCE OF A SOLID ADSORBENT

Frederick W. Sullivan, Jr., Summit, N. J., assignor to Hydrocarbon Research, Inc., New York, N. Y., a corporation of New Jersey Application July 13, 1946, Serial No. 683,324

6 Claims. (Cl. 260—449.6)

The present invention relates to a method for effecting catalytic conversions wherein gaseous reactants flow through a reaction zone in contact with a solid catalyst to produce a reaction product having a molecular weight greater than that of the feed gases.

The present invention is concerned more particularly with carrying out a conversion reaction wherein the gaseous reactants passing in contact with a catalyst mass are associated with an active adsorbent material, effective under the reaction conditions, which preferentially adsorbs products of reaction and thus, in effect, removes them from the proximity of the reaction. In the usual catalytic operation of the type mentioned above the reactant gases in contact with the catalyst mass are progressively converted to the desired reaction products with the result that the feed gases become relatively diluted as the reaction progresses with the formation of diluting reaction products. Moreover, many reaction products tend to adsorb on the surface of the catalyst itself and tend to impair its function.

The present invention has as one of its primary objects the adsorption of the reaction products, with the result that the partial pressure of the residual reactant feed materials is maintained at a relatively high level to promote efficient reaction.

A further object is to promote desorption from the catalyst surface, with resulting improvement in catalytic activity.

The present invention may be effectively carried out in any system wherein the adsorbent agent, discrete from the catalyst, may be carried through the reaction zone, and continuously removed for the recovery of the adsorbed products of reaction, preferably with continuous return of the reactivated adsorbent material to the reactor.

This result may be achieved in a number of ways. For example, a mixture of catalyst and adsorbent material may be continuously circulated through the reactor, continuously separated from the effluent reactant gases, treated for recovery of the adsorbed products, and again returned to the reactor in contact with the fresh feed gases. It is most advantageous, however, to pass the gaseous reactants containing suspended activated adsorbent material in powdered form, or in the form of a dust, through a mass of relatively coarse catalytic material confined within the reaction zone. While this type of operation may be employed with fixed catalyst bed operations wherein the particles of catalyst permit passage of the adsorbent entrained in the reactants, the invention is ideally applied in the case of a catalyst comprising a mass of fluidized particles which are relatively coarse with respect to the particles of the adsorbent agent and thus confined within the reaction zone under the conditions of flow prevailing.

In accordance with the preferred type of operation mentioned, the gaseous reactants and suspended adsorbent material flow through the fluidized mass of relatively coarse particles under conditions such as to maintain the coarse particles in a state of substantially uniform fluidization along the vertical dimension of the reactor, but such that there is no material entrainment of coarse particles in the vapor stream from the reactor. To this end, there preferably is no substantial differential between the rate of flow of the vapor and the adsorbent powder through the reaction zone, and the concentration of adsorbent powder in the effluent stream will be substantially the same as that in the stream entering the reaction zone.

The invention is of particular application to the catalytic conversion of carbon oxides and hydrogen for the production of hydrocarbons, oxygenated hydrocarbons and the like. The passage of the relatively fine adsorbent material appears to facilitate fluidization of the relatively coarser catalyst particles and at the same time passes through the mass of catalyst in a turbulent and relatively random flow. As a result, the adsorbent tends to make good and repeated contact with the separate and discrete catalyst particles, facilitating the accumulation of the reaction products. In short, there is a continuous scrubbing action which promotes the adsorption and removal of the products of reaction from the active surfaces of the catalyst into the moving adsorbent solids with the result that there is a more effective utilization of the residual and unreacted feed gases as the reaction progresses.

It is significant also that the continuous introduction of the adsorbent particles to the reaction zone assures a high degree of temperature uniformity within the catalyst mass by a tendency of the adsorbent to take up excessive heat which may be locally liberated at minute points on the catalyst surface, and distribute this heat at the optimum controlled average temperature of the mass. So also the heat loss of the recycling adsorbent to the catalyst bed promotes overall cooling and may be controllably enhanced if desired by cooling of the adsorbent during recirculation.

It is to be understood, however, that in the case of catalytic reduction of carbon monoxide and other strongly exothermic reactions the primary means of heat transfer from the mass of fluids and solids most suitably takes the form of adequate cooling surfaces in contact with the catalytic mass. Thus, for example, the reaction zone may comprise a vertical shell comprising a plurality of vertical tubes extending through the catalyst mass and supplied with a suitable cooling liquid or fluid; or the reaction may be carried out in the tubes which are in turn surrounded by the cooling fluid so that heat removal occurs indirectly through the walls of the tubes. By this means the temperature throughout the mass of catalyst can be kept within not more than 5° F. variation from a predetermined reaction temperature level.

The adsorbent powder should consist of particles of suitable fineness to permit fluidized passage with the reactant vapors through the reaction chamber. While the size thereof may be widely varied in accordance with the velocity of gaseous flow and the density of the adsorbent selected, I find that in terms of practical operation with which I am familiar the adsorbent may consist of particles which pass through a 200 mesh screen. Where, however, high linear velocities are resorted to, the adsorbent material may comprise particles as large as 100 mesh size or even larger.

The catalyst particles on the other hand, in the preferred form of operation, may range from 60 to 200 mesh when operating with the adsorbent agent of the preferred particle size stated, although here again the particle size is related to effective fluidization and maintenance of the desired conditions of reaction. Those skilled in the art of fluidization will appreciate that the relative densities of the adsorbent and the catalyst particles will influence the respective particle sizes chosen for the two materials.

A suitable catalyst for the reduction of carbon monoxide may comprise an iron powder containing about 1 to 2% potassium oxide and about 2 to 3% alumina. However, it is contemplated that the catalyst may comprise other metals of the iron group such as cobalt, nickel, ruthenium, etc., and any other of the conventional promoters may be employed such as the oxides of thorium, magnesium uranium and vanadium. Alternatively, a supported type of catalyst may be employed wherein the metal of the iron group together with the promoters are supported upon a material such as diatomaceous earth, silica gel, Filtrol and the like.

The relatively fine particle adsorbent is necessarily selected from the class of active adsorbents capable of preferentially adsorbing a material proportion of hydrocarbon reaction products at the conditions prevailing in the reaction zone. While this may vary widely depending upon the specific reaction carried out, the products produced, and particularly the temperatures and pressures prevailing, the catalytic reduction of carbon monoxide in the presence of an iron catalyst, for the production of hydrocarbons and oxygenated hydrocarbons, embodies a rather severe application of this principle. Thus, for example, such a reaction may be carried out at a temperature above 500° F., preferably at 600° F., and under a pressure of about 200 to 250 pounds per square inch gauge. One adsorbent suitable for operation under these conditions comprises the commercial activated charcoal known as "coconut charcoal," although various other activated charcoals may be employed by proper selection in accordance with the prevailing conditions. Thus, for many purposes, including the catalytic reduction of carbon monoxide, such adsorbent materials as activated alumina and silica gel are suitable equivalents.

Operation of the foregoing illustrative process under elevated pressure is particularly advantageous in that reactivation can be accomplished outside the reaction zone by simple release of pressure accompanied, where desired, by subsequent treatment with a suitable stripping gas. In other cases, however, where elevated pressures are not employed it will be necessary and desirable to reactivate the adsorbent at an increased temperature or by other conventional means.

In order to illustrate the operation of the invention in greater detail, reference is now made to the accompanying drawing wherein numeral 1 indicates a vertical reaction tower containing a fluidized mass of relatively coarse particles of catalyst. Synthesis gas, flowing from a source not shown, is conducted through a pipe 2 to the interior of the reaction tower by way of the conical bottom 3.

This gas may contain carbon monoxide and hydrogen in the proportion of about 2 mols of hydrogen per mol of carbon monoxide, and normally contains some additional diluent, as for example about 14% carbon dioxide. Advantageously the synthesis gas may be preheated to from about 200 to 500° F. depending upon the type of catalyst employed and the nature of the reaction products desired. The synthesis gas introduced into the conduit 3 entrains and suspends therein an activated adsorption agent supplied through means explained subsequently. It is important to note that the velocity of the gas flow upwardly through the reactor is to be maintained at a sufficient value to carry the suspended adsorbent powder upwardly through the mass of relatively coarse catalyst, as well as to maintain the coarse particles of catalytic material in a state of uniform or so-called dense phase fluidization throughout the vertical dimension of the reactor.

During flow through the fluidized mass the synthesis gas undergoes conversion into the desired products, e. g., hydrocarbons boiling within the range of gasoline, when using the iron powder catalyst described above at a temperature of 600 to 625° F. and under a pressure of 200 pounds per square inch gauge. The adsorbent particles entrained in the reaction gases adsorb a substantial proportion of the hydrocarbons as well as oxygenated hydrocarbons as they are formed and pass out through the conduit 4 of the reactor 1.

Exothermic heat of reaction is extracted from the reaction zone primarily by a heat exchange element 5, comprising a plurality of vertical tubes extending through the mass of catalyst and supplied internally with a heat-conducting fluid such as water, diphenyl, mercury, or the like. As is known in the art, such fluid may undergo partial or substantially complete vaporization within the tubes under controlled conditions of pressure such as to regulate the effective average temperature of the catalyst mass during reaction. The cooling fluid is introduced from a source not shown through pipe 6 at the lower end of the vertical tubes, and the effluent liquid or vapor, as the case may be, is removed through the upper or outlet pipe 7.

The reaction gases flow through the conduit 4 to a separator 9, which, while indicated more or less diagrammatically, may comprise any number of units provided with mechanical or electrical means for precipitating the adsorbent powder from the entraining gases. The gases thus separated are continuously discharged through a pipe 10 leading through a pressure reduction valve 11, to any suitable cooling, separating, or fractionating means of conventional type for recovery of the desired products.

The separated adsorbent powder passes from the separator 9 into a hopper 9A and thence into a standpipe 12 where it gravitates to any suitable type of feed valve 13 which may take, for example, the form of a star feeder, operated to continuously supply the powder through the pipe 12 into a reactivation chamber 15. Pipe 14 is used to introduce an aerating gas, such as hydrogen, methane, etc., to maintain the powder in pipe 12 in a free-flowing condition.

The reactivating chamber 15 is maintained at a substantially lower pressure than the reactor, preferably atmospheric, whereby the adsorbed hydrocarbons are released from the particles and pass outwardly through pipe 16. The gases flowing through pipe 16 discharge into cyclone 17 to separate any entrained particles and thence pass through pipe 18 into the main product line 10. The desired pressure differential may be maintained by conducting pipe 18 into the aforementioned pipe 10 just beyond the throttle valve 11, which is set to reduce the elevated pressure prevailing in the reactor 1 to, for example, atmospheric. In the case of adsorbents requiring further treatment for reactivation, additional heating or stripping means may be provided in the lower portion of the reactivator. There is shown, for example, a pipe 20 adapted to supply hydrogen, carbon dioxide, methane, steam or any other suitable stripping gas, from a source not shown, through the mass of particles therein accumulated. So also a heat exchanger may be provided in standpipe 12 or reactivator 15 to facilitate reactivation by heating. Any solids carried into cyclone 17 are returned to chamber 15 by way of standpipe 19.

A second star feeder 21 is provided for the purpose of delivering powdered reactivated adsorbent agent from the reactivator 15 into the hopper 22. The adsorbent is discharged from hopper 22 through feed valve 23 and pipe 24 into pipe 2 for entrainment in the incoming feed gases and return to the reactor 1.

It will be apparent from the foregoing that where heating is resorted to for reactivation, subsequent cooling means of any conventional form is desirably inserted in hopper 22. The present invention, in the preferred form illustrated, contemplates entrainment of the activated adsorbent in the incoming stream of feed gases, passage of the reactant material and the adsorbent particles through the fluidized mass of catalyst in the reactor, subsequent separation of adsorbent particles from the reaction products, reactivation of the adsorbent, and return of reactivated adsorbent to the incoming stream.

By way of illustration, when operating the process for the production of hydrocarbons approximately in the gasoline boiling range the reactor contains a mass of catalytic iron powder promoted with about 1 to 2% potassium oxide and 2 to 3% alumina, the particle size being of about 60 to 200 mesh. The synthesis gas comprising about 1 mol of carbon monoxide to 2 mols of hydrogen and with about 14% carbon dioxide is introduced through pipe 2 at a temperature of about 550° F. Before entering the reaction zone, the synthesis gas entrains about 0.1 pound of powdered activated coconut charcoal per standard cubic foot of feed gas. The activated charcoal is of such particle size that all of the material passes through a 200 mesh screen.

The feed gas passes through the mass of relatively coarse catalyst particles at a linear velocity of about 1½ feet per second (determined on the basis of the volume flow of inlet gas and the internal volume of the reactor neglecting the space occupied by the solids). Under the conditions prevailing in the reactor the coconut charcoal particles in the reactor are carried out by entrainment in the effluent reaction gases at a rate equivalent to that of their introduction.

The reaction zone is maintained at a temperature of about 600° F., and under a pressure of 200 pounds per square inch gauge. The effluent mixture of reaction vapors and entrained adsorbent from the reactor are separated and the adsorbent particles are passed into a zone of atmospheric pressure for reactivation. The hydrocarbon vapors released during the reactivation are combined with those separated from the adsorbent and together they are passed to means for further treatment and fractionation. The reactivated particles are then reintroduced into the incoming stream of fresh feed and thus repeatedly recycled to the reaction system.

When operating in this manner, a substantial proportion of the reaction products are taken up by the adsorbent particles in the immediate vicinity of their formation within the reactor, are withdrawn from the reactor by these particles and are liberated from the particles in the reactivation chamber. Thereafter the liberated products are treated, separated, etc., in any desired manner.

While mention has been made of specific temperature conditions, it is contemplated that the temperatures may range from 200 to 700° F. depending upon the catalyst employed and the type of product required. As further indicated, the invention is also applicable to other types of exothermic reactions and may have application as well in the operation of endothermic conversion reactions wherein it is desired to adsorb reaction products as a means of promoting reaction.

The present invention thus provides a process by which a portion at least of the reaction products are adsorbed from the active surfaces of the catalyst as they are formed, thus promoting the conversion and in effect increasing the partial pressure of the remaining fresh reactant gases in contact with the catalyst. It is particularly significant that the action of the usual adsorbent agent is such as to take up the higher molecular weight reaction products. Thus, particularly in the case of the reduction of carbon monoxide, there is a tendency to withdraw from the reaction, products which have reached a predetermined molecular weight whereby the reaction products tend to be maintained within a limited molecular size. In other words, in following this invention in the synthesis of motor fuel there is a tendency to increase the production of liquid hydrocarbons boiling in the gasoline range and to decrease the formation of higher boiling hydrocarbons, e. g., diesel oil.

The invention is to be sharply distinguished from processes wherein adsorption is limited to that which may occur on the catalyst particles or on the carrier material in the case of supported catalysts.

The invention is particularly useful in connection with the operation of a staged process wherein the reactant feed gases are partially converted in a controlled reaction zone, the reaction gases being successively passed to succeeding reaction zones for further completion of the reaction with or without intermediate treatment or selective removal of products. Thus while this arrangement has not been specifically illustrated above, it will be fully appreciated from the foregoing disclosure that the problem to which the present invention is directed may be more severe in later stages of a staged operation where the molecular weight and/or proportion of the reaction products may become greater. Accordingly, it is desirable in some processes to utilize the invention set out in the specific example above, for instance, as a second and/or later stage of a multi-stage process with the attendant advantages.

For the preferred embodiment of this invention involving fluidization, it is important that the adsorbent powder have a smaller settling rate than that of the catalyst powder employed. The rate of settling of a powder is dependent on the size, shape and density of the particles and generally it is convenient to select a powder of smaller particle size to attain a smaller settling rate. This explains the frequent references in this specification to relatively fine adsorbent particles and relatively coarse catalyst particles. Broadly, however, the adsorbent powder does not have to be any finer and may even be coarser than the catalyst powder if there is sufficient difference in the densities of the adsorbent and catalyst particles. Thus, for instance, a powdered adsorbent because of its low density and/or plate-shaped particles might have a coarser particle size than the powdered catalyst used in the reactor and still be operative in accordance with the principles of this invention. Those familiar with fluidization will appreciate that a powder of smaller settling rate is one whose particles tend to fall or settle less rapidly through the gaseous suspending medium than do the particles of the powder having greater settling rate. It is readily possible for one skilled in the art to select the proper powdered adsorbent and catalyst for any operation in view of the foregoing principles supported by experimental tests.

It will moreover be apparent from the foregoing, that in the operation of the preferred embodiment of the invention it will be desirable to select a mixture of adsorbent and catalyst particles of such relative settling rates that for the rate of gas flow employed, there will result good fluidization of the catalyst particles of higher settling rate substantially without entrainment thereof in the gaseous effluent and yet without excessive classification.

It is well to note that the apparatus shown in the accompanying drawing may be extensively modified while still permitting circulation and reactivation of the adsorbent particles and their remixture with the catalyst particles. Thus in place of the separator shown, a filter of porous alundum or the like may be interposed between the reactor and the outlet tube 4. Such a filter may take any conventional form such, for example, as a porous tube communicating at its upper end with the tube 4, closed at its lower end and extending down into the reactor. This filter serves to separate entrained particles from the effluent gases, the separated particles either dropping back into the fluidized mass or being periodically blown off the filter by periodic blowbacks. Under these conditions the adsorbent particles of lower settling rate would tend to accumulate at the pseudo-liquid level of the fluidized mass. A standpipe connected to the reactor in the vicinity of the pseudo-liquid level would be used to withdraw the adsorbent particles downwardly into a suitable reactivation chamber and then the reactivated adsorbent particles returned to the lower portion of the reactor in any desired manner. This cyclic flow of the adsorbent particles of lower settling rate, as in the previous embodiment, ensures the maintenance of a well-fluidized mixture of adsorbent particles and catalyst particles of higher settling rate by compensating for any tendency of the mixed particles to classify. A modified form of apparatus suitable for this specific operation is disclosed in detail in the copending Riblett application, Serial No. 669,007, filed on May 11, 1946. As in the present application, the copending Riblett application is directed to an operation in which particles of relatively high settling rate and particles of relatively low settling rate are maintained in a state of good fluidization and admixture by returning the particles of lower settling rate which tend to accumulate at the pseudo-liquid level to the bottom of the fluidized mixture.

While mention has been made of several possible methods of separating the adsorbent material from the reaction gases, the present invention, where iron or other magnetic materials are used as a catalyst, lends itself particularly to the use of magnetic separation at such times as it may be necessary to separate the catalyst and adsorbent particles for regeneration of the former. Thus, such an arrangement also permits the concurrent passage of the adsorbent and catalyst particles through the reaction zone and withdrawal of both therefrom by entrainment in the effluent gases; the mixed solids may be segregated by a magnetic separator, the catalytic particles revivified in a suitable chamber, the adsorbent particles purged of adsorbed products in another chamber, and both types of particles would be returned to the reaction zone in good admixture, to complete the cycle of operation. The invention moreover is particularly advantageous when used in connection with metallic catalysts unassociated with a support, in which instance the adsorbent tends to accumulate a relatively larger proportion of the reaction products because the relative adsorption propensity of the adsorbent particles is greater than that of the catalyst particles.

Obviously many modifications and variations of the invention as set forth above may be made without departing from the spirit and scope thereof, and therefore only such limitations should be imposed as are inherent in the appended claims.

I claim:

1. A process for effecting catalytic hydrogenation of carbon oxides to produce hydrocarbons, oxygenated hydrocarbons and mixtures thereof, involving continuously passing snythesis gas comprising hydrogen and carbon monoxide through a dense fluidized mass of relatively coarse, solid particle hydrocarbon synthesis catalyst within a reaction zone at an elevated temperature effective for said catalytic reaction, passing through said dense fluidized mass, in suspension in said synthesis gas, relatively fine, adsorbent particles substantially free of adsorbed material and capable of adsorbing a substantial amount of the normally liquid products of reaction at the temperature prevailing in said reaction zone, withdrawing from the upper portion of said reaction zone said adsorbent particles after they have adsorbed said normally liquid products of reaction, recovering the adsorbed products of reaction from the withdrawn adsorbent particles, and continuously maintaining said passage of adsorbent particles through said dense fluidized mass at a rate such that a substantial amount of said normally liquid products of reaction are adsorbed by said adsorbent particles and withdrawn therewith from said reaction zone.

2. The process according to claim 1 wherein the adsorbed products of reaction are recovered from the withdrawn adsorbent particles by subjecting said adsorbent particles to a substantial decrease in pressure.

3. The process according to claim 1 wherein the adsorbed products of reaction are recovered from the withdrawn adsorbent particles by contacting said adsorbent particles with stripping gas.

4. The process according to claim 3 wherein the withdrawn adsorbent particles are contacted with the stripping gas while being maintained as a dense fluidized mass.

5. The process according to claim 1 wherein the adsorbent particles are activated charcoal.

6. A process for effecting catalytic reaction of gaseous reactants into products of higher molecular weight by contact with a solid catalyst within a reaction zone maintained under reaction conditions, involving continuously passing said gaseous reactants through a dense fluidized mass of relatively coarse particles of said catalyst within said reaction zone, passing through said dense fluidized mass, in suspension in said gaseous reactants, relatively fine, adsorbent particles substantially free of adsorbed material and capable of adsorbing a substantial amount of the normally liquid products of reaction under reaction conditions, withdrawing from the upper portion of said reaction zone said adsorbent particles after they have adsorbed said normally liquid products of reaction, recovering the adsorbed said normally liquid products of reaction from the withdrawn adsorbent particles, and continuously maintaining said passage of adsorbent particles through said dense fluidized mass at a rate such that a substantial amount of said normally liquid products of reaction are adsorbed by said adsorbent particles and withdrawn therewith from said reaction zone.

FREDERICK W. SULLIVAN, Jr.

REFERENCES CITED

The following references are of record in the file of this patent:

UNITED STATES PATENTS

| Number | Name | Date |
|---|---|---|
| 2,360,787 | Murphree et al. | Oct. 17, 1944 |
| 2,393,240 | Dreyfus | Jan. 22, 1946 |
| 2,396,109 | Martin | Mar. 5, 1946 |
| 2,453,874 | Sweetser | Nov. 16, 1948 |
| 2,473,129 | Atwell | June 14, 1949 |

FOREIGN PATENTS

| Number | Country | Date |
|---|---|---|
| 278,745 | Great Britain | Jan. 7, 1929 |
| 500,264 | Great Britain | Feb. 6, 1939 |